United States Patent [19]  [11] 3,941,768
Stocker  [45] Mar. 2, 1976

[54] ONE STEP DIAZOTIZATION COUPLING PROCESS

[75] Inventor: Emil Stocker, Riehen, Basel, Switzerland

[73] Assignee: Ciba-Geigy AG, Switzerland

[22] Filed: Mar. 2, 1972

[21] Appl. No.: 231,366

Related U.S. Application Data

[63] Continuation of Ser. No. 827,933, May 26, 1969, abandoned.

[30] Foreign Application Priority Data

May 30, 1968 Switzerland............... 8029/68

[52] U.S. Cl. ............... 260/184; 260/152; 260/154; 260/157; 260/164; 260/174; 260/178; 260/181; 260/203; 260/204
[51] Int. Cl.$^2$............... C07C 107/04; C09B 29/00; C09B 31/02; C09B 35/02
[58] Field of Search .......... 260/208, 203, 204, 184, 260/152, 154, 157, 164, 178, 174, 181, 176

[56] References Cited
UNITED STATES PATENTS

| 2,478,767 | 8/1949 | Locke | 260/144 |
|---|---|---|---|
| 2,478,768 | 8/1949 | Locke | 260/144 |
| 2,894,941 | 7/1959 | Bachman et al. | 260/141 |
| 3,169,955 | 2/1965 | Siebert et al. | 260/176 |
| 3,336,288 | 8/1967 | Stocker et al. | 260/203 |
| 3,423,391 | 1/1969 | Kindler et al. | 260/141 |
| 3,627,748 | 12/1971 | Roueche | 260/152 |
| 3,652,533 | 3/1972 | Roueche | 260/203 |
| 3,793,305 | 2/1974 | Balon | 260/154 |

OTHER PUBLICATIONS

Houben-Weyl, "Methoden der Orrganischen Chemie", Vol. 10/3, pp. 28–32, (1965).

Primary Examiner—Floyd D. Higel
Attorney, Agent, or Firm—Wenderoth, Lind & Ponack

[57] ABSTRACT

A process for producing metal-free azo pigments in purely organic liquid or aqueous/organic liquid containing at most 10% of water calculated on the total weight of the suspension is described. In this one-step process, a suitable aromatic amine is diazotized without isolation of the obtained diazo compound and coupled with a coupling component. Both reactions are carried out in purely or essentially organic medium. The latter consists essentially of such amount of an organic liquid that a substantial portion either of the diazo component or of the coupling component or of both these reactants remain undissolved. Both reactants must be free from sulphonic acid groups. If the resulting azo pigment contains carboxylic acid groups, these can be subsequently converted to the corresponding amido or ester groups.

10 Claims, No Drawings

ONE STEP DIAZOTIZATION COUPLING PROCESS

This is a continuation of application Ser. No. 827,933, filed May 26, 1969, and now abandoned.

DESCRIPTION OF THE INVENTION

The invention concerns a new process for the production of suspensions of metal-free azo pigments in an organic liquid medium, containing no water or at most 10 % of water, and of such metal-free azo pigments.

STATE OF THE ART

The difficulties occurring with regard to yield, purity or shade and uniform quality of the azo pigments of higher molar weights if, in the case of the normal aqueous coupling of diazo compounds not having sulphonic acid groups for promoting water solubility, coupling components are used which likewise have no sulphonic acid groups which promote water solubility, are known and can scarcely be avoided. In these cases, use is sometimes made of wetting and dispersing agents, and also protective colloids, as auxiliary agents in the reaction mixture. These measures are however frequently unsatisfactory technically. Using these standard methods, therefore, it is scarcely possible to combine diazo compounds not having solubilising sulphonic acid groups with twice coupling azo components not having solubilising sulphonic acid groups to produce uniform twice coupling products. It has already been suggested that these difficulties be avoided by performing the coupling in non aqueous medium, in a concentrated reaction mixture and with intensive mechanical mixing and, optionally, by conditioning the obtained pigments by means of a heat treatment with high-boiling organic solvents. Unavoidably in this case, the diazo compounds have to be produced in a separate operation. The diazo compounds have to be isolated in the form of their naphthalene mono- and disulphonic- acid salts or as double salts of zinc chloride and then, generally, they also have to be mixed with inorganic, water-binding salts. This is a procedure which is complicated and time-consuming.

THE INVENTION

It has now been found that metal-free azo pigments can be produced in one operation from diazo components and coupling components, which are free of sulphonic acid groups, by diazotizing and coupling in organic solvents and in a concentrated reaction mixture, optionally with heat treatment of the obtained azo pigments in high-boiling solvents in a one-step process and consequently very economically, if the diazotization is performed, without isolation of the diazo compound, in an organic medium and the coupling is performed in a heterogeneous phase, in such a way that the diazo and/or the coupling components are present in organic suspension, whereby the organic solvents contain at most 10% water.

More in particular, the invention provides a novel process for producing metal-free azo pigments or suspensions thereof in an organic medium which process comprises a. diazotizing a diazotizable aromatic amine free from sulphonic acid groups with a non-aqueous diazotizing agent or with an aqueous diazotizing agent of such concentration that the water content in the final pigment suspension does not exceed the said 10 %,
and at a temperature below the decomposition temperature of the unstabilized diazo compound being formed,
in an easily recoverable organic liquid which contains a coupling component free from sulphonic acid groups and has a sufficiently low pH to set free nitrogenous acid from the diazotizing agent;
said organic liquid being selected from an aromatic hydrocarbon which is either unsubstituted or substituted by at least one of nitro, halogen and lower alkyl;
the amount of said organic liquid being such that a substantial portion either of the diazo component or of the said coupling component, or of both these reactants remains undissolved therein, and b. reacting said coupling component with the unstabilized diazo compound as the latter is being formed, in said organic liquid, thereby obtaining a suspension of the corresponding azo pigment in said organic liquid, which suspension contains no water or at most up to 10 % of water, calculated on the total weight of the suspension.

In producing azo pigments using this new process, it was not to be anticipated that the coupling in heterogeneous organic phase would proceed smoothly, even when the coupling components and/or the diazo components have low solubility in the concerned organic solvent or mixture of solvents, which contain at most 10% water. Surprisingly, pure and deeply coloured pigments are obtained in good yield.

The working procedure according to the invention, renders unnecessary the stabilisation, isolation and the drying of the diazo compound. The diazotization, coupling and optionally the conditioning too of the obtained metal-free azo pigment can, surprisingly, be carried out in a solvent or a mixture of solvents, without any involved intermediate isolation or intermediate drying, in one operation. A particularly remarkable aspect is that, depending on conditions, it is even possible to perform the diazotization and coupling practically simultaneously. The process, according to the invention, can be carried out rationally and economically using relatively cheap solvents, which in the majority of cases can be recovered.

According to the invention, use is made in particular of those metal-free pigments containing no sulphonic acid groups, the molecular weight of which is at least 500 and which contain at least two -CO-NH-groups in the molecule, and which yield inferior products if prepared according to commonly used coupling reactions in aqueous medium. With regard to the metal-free azo pigments, the ones mainly concerned are those of the 2-hydroxy-naphthalene-3-carboxylic acid arylamide series, having no active methylene or tertiary nitrogen group.

Listed below are some examples of diazo and tetrazo components as well as once and twice coupling components which are suitable with regard to the process according to the invention. Those components are preferably chosen whereby the obtained metal-free azo pigments contain at least two —CO—NH-groups.

EXAMPLES FOR DIAZO COMPONENTS 2,4- and 2,5-dichloraniline,
2,4,5-trichloraniline,
2-chloro-4-nitraniline,
4-chloro-2-nitraniline,
2-methoxy-4-nitraniline, 4-methoxy-2-nitraniline,
2-aminobenzoic acid methyl ester,
aminoterephthalic acid dimethyl ester and -diethyl ester,
4-methoxy-3-aminophenyl benzyl sulphone,
4-methyl-3-aminodiphenyl sulphone,
4-methoxy-3-aminobenzene sulphonic acid diethyl amide,
2-methoxy-5-methyl-4-aminobenzene sulphonic acid methyl amide,
2,5-dimethoxy-4-aminobenzoic sulphonic acid anilide,
2,5-dimethoxy- and 2,5-diethoxy-4-benzoylaminoaniline,
2-methoxy-5-methyl-4-benzoylaminoaniline,
4-ethoxy-3-aminobenzamide,
4-methoxy-3-aminobenzoic acid anilide,
4-methyl-3-aminobenzoic acid -2'4'-dimethylanilide,
4-methyl-3-aminobenzoic acid-4'-chloranilide,
4-chloro-3-aminobenzoic acid -2'-methyl-5'-chloranilide, 4-chloro-3-aminobenzoic acid-2'4'- and -2'5'-dichloranilide,
4-chloro-3-aminobenzoic acid-2'4'5'-trichloranilide,
4-chloro-3-aminobenzoic acid-2'-methyl-3'-chloroanilide,
4-carbethoxy-3-aminobenzoic acid-2'5'-dichloranilide,
4-chloro-3-aminobenzoic acid,
4-methoxy-3-aminobenzoic acid,
4-methyl-3-aminobenzoic acid,

EXAMPLES FOR TETRAZO COMPONENTS 3,3'-dichlorobenzidine,
2,5,2'5'-tetrachlorobenzidine,
3,3'-dimethoxybenzidine,
3,3'-dimethylbenzidine.

EXAMPLES FOR COUPLING COMPONENTS COUPLING ONCE 2-hydroxynaphthalene-3-carboxylic acid anilide, -4'-chloranilide, -3'-nitranilide, -2'-methoxyanilide, -2'-methylanilide, -2'3'-dimethylanilide, -2'4'-dimethoxy-5'-chloranilide, -2'5'-dimethoxy-4'-chloranilide, -2'-methyl-4'-chloranilide, -2'-methyl-4'-methoxyanilide,
2-hydroxycarbazole-3-carboxylic acid -4'-chloranilide,
6-(2'3'-hydroxynaphthoylamino)-2,4-dioxotetrahydroquinazoline,
5-(2',3'-hydroxynaphthoylamino)-benzimidazolone-(2),
1-(2', 3'-hydroxynaphthoylamino)-2-methoxy-5-chloro-4-benzoyl-aminobenzene,
3-(2', 3'-hydroxynaphthoylamino)-4-chlorobenzoic acid-2''5''-dichloranilide,
2-hydroxynaphthalene-3-carboxylic acid,
2-hydroxycarbazole-3-carboxylic acid.

EXAMPLES FOR COUPLING COMPONENTS COUPLING TWICE bis-(2'3'-hydroxynaphthoyl)-1,4-diaminobenzene, -1,4-diamino-2-chlorobenzene, -1,4-diamino-2-methyl-5-chlorobenzene, -benzidine, -o-tolidine, -1,4-diamino-2,5-dimethoxybenzene, -1,4-diamino-2,5-dimethylbenzene, -1,4-diamino-2,5-dichlorobenzene, -1,4-diamino-2-methoxy-5-chlorobenzene, -pp'-diaminodiphenyl ether.

Sovents to be used according to the invention are, especially unsubstituted and halogenated and/or nitrated liquid aromatic hydrocarbons, e.g. o-dichlorobenzene, chlorobenzene, xylene, benzene, toluene, nitrobenzene, as well as lower alkanols.

These solvents should be acidified in order to improve the yield rate of diazonium compound.

The diazotizing and coupling medium can also contain water in addition to the predominating organic part. The water content, if any, in the organic solvent, whould be less than about 10 %, in order to prevent the formation of undesirable emulsions.

Used as diazotizing agents are the esters of nitrous acid such as amyl nitrite, butyl nitrite, the methyl or ethyl ester or also crystalline or concentrated aqueous sodium nitrite. But also applicable as diazotizing agents are octyl nitrite, dinitrogen tetroxide, dinitrogen trioxide or nitrosyl chloride or -bromide, used according to the invention. Sodium nitrite can likewise be used, according to the process, in the same way as the esters of the nitrous acid.

The processing of the pigments produced according to the process entails removal of the applied solvent, by filtering, centrifuging or distilling.

If the filtered off azo pigment, produced according to the invention, contains sodium chloride or another inorganic salt, it is advantageous to firstly wash it with the organic solvent used for conditioning, to which suitable wetting agents are added such as, e.g. Turkey-red oil, and afterwards with water. If sodium acetate is present in the filter cake, it is preferable to wash with the organic solvent and then with methanol. The pigment can be particularly easily washed, if it contains no alkali salt at all, i.e. where for example, alkyl nitrite is used for diazotizing with no alkali salts otherwise having been used. In this case, washing with the solvent used in the case of the conditioning or coupling suffices.

A modification of the process according to the invention consists of firstly producing, using an analogous procedure in an organic agent, azo dyestuffs having unmodified carboxyl groups and reacting these in the dyestuff, likewise without intermediate isolation by way of the acid chlorides, with mono- or diamines or alcohols to give the corresponding acid amide derivatives or esters. In this case too, the used azocarboxylic acids possess, apart from the carboxylic acid groups to be converted into the acid halide groups, no water-solubilizing sulphonic acid groups. The carboxylic acid group, which is converted to the ester or arylamide group, can be present in the diazo component and/or the coupling component. In this manner, azo dyestuffs can be produced having one or several free carboxyl groups in the molecule and which are suitable as intermediate products for the production of pigments, whereby the carboxylic acid group or groups are transformed into the corresponding carboxylic acid halide groups, to be then converted into arylamides or esters. The advantage of this method of procedure, according to the invention, is that valuable azo pigments are obtained in a solvent or mixtures of solvents, without any intermediate isolation, from diazotization, via coupling and acid chloride formation to the ester or arylamide formation and, optionally, heat treatment.

Optionally, a heat treatment follows the production, according to the invention, of the pigments, i.e. the diazotization and coupling in an organic solvent without intermediate isolation of the diazotization component. This heat treatment can take place in the same solvent or solvent mixture in which diazotization and coupling have been performed; alternatively the solvent can be changed. In general, such a heat treatment is performed at temperatures above 100°C, usually between 110° and 180°C, and possibly using pressure. A heat treatment or conditioning of the pigments is carried out particularly where the fastness to migration of the pigments, produced according to the invention, in PVC has to be increased.

A further advantageous embodiment of the process consists of not, or only partially, isolating after filtering and washing, the pigment produced according to the invention, which is contained, in general, to the extent of 5 % in the solvent. After the pigment has been filtered off, the solvent concerned still remaining in the pigment can be replaced or replenished entirely or partially by another solvent. It is also possible to add to these pigment pastes obtained according to the invention, organic polymers such as, e.g. PVC, cellulose acetate, cellulose butyrate or resins. This addition depends on the application purpose and on the specific solvent used or later added.

Pigment pastes, containing solvent, are obtained in this manner, which contain the pigment in very fine dispersion and which are suitable directly for the pigmenting of organic polymer material such as, for example, lacquers or plastics. Using chlorinated hydrocarbons, according to the invention, to which optionally some PVC is also added, the pigment pastes obtained after filtering off the pigment, can be used directly for the pigmenting of PVC or other plastics.

The pigments, produced according to the invention, can be used in inorganic or organic media for the dyeing or pigmenting of paper in the pulp or in the coating, of lacquers, plastics such as, e.g. polyvinyl chloride, polyurethane, polypropylene or polyethylene, cellulose ester, spinning solutions, foils or for the pigment printing of textiles.

The following examples serve to illustrate the invention, whereby the temperatures are given in degrees Centigrade. Where otherwise not stated, the term "parts" denotes parts by weight. Parts by weight are in relation to parts by volume as gram to cm³.

EXAMPLE 1

31.6 g of pulverised 4-chloro-3-amino-benzoic acid 2'4'-dichloranilide and 29.5 g of likewise pulverised 2-hydroxy naphthalene-3-carboxylic acid-2'4'-dimethyl anilide are sprinkled, while stirring, into 710 g of o-dichlorobenzene after which are also added 105.0 g of glacial acetic acid and 20.0 g of ethanol. After stirring for one hour at 20°, 22.8 g of 33.3 % aqueous sodium nitrite solution are added dropwise at 20° C within 15 minutes, whereby the temperature rises to 27° and pigment formation commences. The suspension is stirred for 15 hours at 30° – 32° and is then heated within 2 hours to 140°. A distillate of about 75 ml is thereby obtained on the descending condenser. The pigment is then filtered off hot, washed with o-dichlorobenzene, then with an 8% solution of Turkey red oil in o-dichlorobenzene and finally with hot water and is then dried at 80°. The amount of red pigment obtained is 55.0 g.

The o-dichlorobenzene is recovered by distillation or by steam distillation.

EXAMPLE 2

To 710 g of o-dichlorobenzene are added, while stirring, 31.6 g of 4-chloro-3-amino-benzoic acid-2'4'-dichloranilide and 29.5 g of 2-hydroxy-naphthalene-3-carboxylic acid-2'4'-dimethylanilide, both in powder form and, finally, 60.0 g of glacial acetic acid. After stirring for half an hour, the mixture is cooled to 15° and gaseous ethyl nitrite (B.P. 16°) is fed into the suspension through a gas inlet tube for 20 minutes, whereby pigment formation commences forthwith. The ethyl nitrite is produced in a small connected flask by adding dropwise 14.2 g of 50% aqueous sulphuric acid to a stirred mixture of 24.9 g of 33.3% aqueous sodium nitrite solution and 6.25 g of ethanol at approximately 25°. The residue of ethyl nitrite finally remaining in the apparatus is forced by air into the suspension. The latter is heated within one hour to 30°, in a further hour to 80° and in a further hour to 140°, whereby a small amount of easily volatile fractions are distilled off. The pigment is then filtered off hot, washed with o-dichlorobenzene and dried at 80°. The yield amounts to 55.1 g of practically anhydrous red pigment which for example, exhibits in soft polyvinyl chloride a good fastness to migration and in lacquers a very good fastness to cross-lacquering.

If the pigment suspension is not heated, being instead filtered at 30°, washed with the above solvent and dried at 80°, a product is obtained having a somewhat less good fastness to migration but having a very good fastness to cross-lacquering.

The process can be carried out just as well using methyl nitrite in place of ethyl nitrite. The methyl nitrite can be conveniently prepared from sulphuric acid, methanol and aqueous sodium nitrite. In the small scale test, approximately 50% excess of this diazotizing agent is advantageously used; there is practically no nitrosation of the coupling components.

Results which are approximately as good can also be obtained by using chlorobenzene, xylene, tetrachloroethane and nitrobenzene in place of o-dichlorobenzene. Also suitable are toluene, benzene, carbon tetrachloride, chloroform and petroleum hydrocarbons.

EXAMPLE 3

To a mixture of 467.0 g of glacial acetic acid and 0.5 g of Turkey-red oil are added, while stirring, 31.6 g of 4-chloro-3-amino-benzoic acid-2'4'-dichloranilide in powder form. To this mixture are then also added dropwise, within 15 minutes, 22.0 ml of 10N hydrochloric acid and the thus obtained suspension is stirred over night at 22°. After cooling to 15°, an addition is made within one minute of 21.5 g of 33.3% aqueous sodium nitrite solution, whereupon an almost clear brown solution is formed. Three minutes later, a solution of 29.5 g of 2-hydroxy-naphthalene-3-carboxylic acid-2'4'-dimethylanilide in 212.0 g of methanol and 8.0 g of sodium hydroxide is added within 3 minutes. The temperature attains 28° and a red pigment suspension is formed. Ten minutes later, 64.5 g of o-dichlorobenzene are added to this mixture and, after a further 40 minutes and while still stirring, heating of the mixture commences whereby the volatile constituents are distilled off over a column, further o-dichlorobenzene being thereby added to the suspension in portions in order to keep the mixture stirrable. Within three hours, an inner temperature of 145° is attained and a total of 710.0 g of o-dichlorobenzene have been added. The pigment suspension is further stirred during one hour at 145° – 147° and is then filtered off hot. It is washed with o-dichlorobenzene, then with the first runnings of the distillate (up to 96° distillation temperature) and finally with water and dried at 80°. By this means are obtained 57.10 g of a brilliant red pigment which can be used for printing inks, plastics or lacquers.

The principal amount of distillate can be used, advantageously made up with glacial acetic acid, for the next batch.

In order not to allow the water content to rise too much in the case of further batches, solid pulverulent sodium nitrite can be used instead of sodium nitrite solution or the aqueous hydrochloric acid can be replaced by an equivalent amount of hydrogen chloride gas.

EXAMPLE 4

Into 475.0 g of methanol are sprinkled, while stirring, 31.6 of pulverulent 4-chloro-3-amino-benzoic acid-2'4'-dichloranilide, whereupon 2.5 g of Turkey-red oil and 45.8 ml of fuming hydrochloric acid (11.8 N) are also added and the suspension is stirred overnight at 25°. The suspension is then cooled to 2° and 7.3 g of pulverulent sodium nitrite are sprinkled in.

In addition, 22.8 g of sodium methylate are dissolved in 135 g of methanol and to this are also added 29.7 g of 2-hydroxy-naphthalene-3-carboxylic acid-2'4'-dimethylanilide, then 2.5 g of an addition product of 18 moles of ethylene oxide to 1 mole of cetyl alcohol, dissolved in 8.0 g of methanol, and then 103 g of o-dichlorobenzene. The thus obtained solution of the coupling components are added, 20 minutes after the nitrite addition, to the diazo suspension within 5 minutes and the formed pigment suspension is stirred during one hour at 30° – 32°. Heating then commences with descending condenser and the mixture is heated, while continually stirring, finally to 145°, whereby a further 645 g of o-dichlorobenzene are added and, firstly, 600 ml are collected as distillate and then 230 ml. After heating for one hour to 145° – 147°, the pigment is filtered off hot, washed with o-dichlorobenzene, then with 230 ml of the higher-boiling distillate, then with some methanol and finally with water. After drying at 65°, 51.2 g of a red pigment are obtained.

The 600 ml of lower-boiling distillate can be used directly for a further diazotization.

EXAMPLE 5

To a fine suspension of 35.0 g of 4-chloro-3-aminobenzoic acid-2'4'5'-trichloranilide and 32.5 g of 2-hydroxy-naphthalene-3-carboxylic acid-1'-naphthylamide in 970 g of o-dichlorobenzene are also added 60.0 g of glacial acetic acid and the mixture is stirred during 2 hours at 15°.

In addition, 14.4 ml of 10N hydrochloric acid are added in 20 minutes, while stirring, to a 15° warm mixture of 24.8 g of 33.3% sodium nitrite solution, 24.0 g of water, 9.8 g of n-butanol and 61.5 g of o-dichlorobenzene. After stirring for a further 10 minutes, the organic layer, which contains the formed n-butyl nitrite, is separated in a separating funnel. This layer is now added within 15 minutes to the suspension of the pigment components, whereby pigment formation commences. The mixture is heated in one hour to 30°, in a further hour to 80° and in a further hour to 140°, whereby volatile fractions are distilled off. Finally, the pigment is filtered off hot, washed with o-dichlorobenzene and dried at 80°. The yield amounts to 60.5 g. The pigment exhibits in soft polyvinyl chloride a good fastness to migration and, in lacquers, a very good fastness to cross-lacquering.

The press cake containing the o-dichlorobenzene can also be used directly without drying or with the addition of further organic solvents for the pigmenting of polyvinyl chloride, polyurethane and lacquers.

EXAMPLE 6

In a 5-necked-flask are dissolved 7.52 g of 2-hydroxy-naphthalene-3-carboxylic acid in 340 g of chlorobenzene while stirring and with heating. At 30° an addition is also made to the solution of 6.48 g of 2,5-dichloraniline, whereupon it is cooled to 18° and, within 15 minutes, methyl nitrite gas is introduced under the surface of the solution, the gas having been generated in a small connected flask by the dropwise addition of 4.90 g of 50% sulphuric acid to a stirred mixture of 10.60 g of 33.3% aqueous sodium nitrite solution and 1.70 g of methanol at 20°. The final residues of the methyl nitrite are conveyed to the reaction vessel by the blowing in of air.

The obtained dyestuff suspension is heated in one hour to 30°, in a further hour to 60° and, after cooling to about 40° and in a vacuum of 22 mm Hg, 20 ml of liquid are distilled off. The content of the flask is now cooled at atmospheric pressure to 30°, whereupon 7.15 g of thionyl chloride are added dropwise within 10 minutes. With a mounted reflux condenser, provided with a calcium chloride tube, the mixture is slowly heated to 80° and it is stirred at 80° – 85° until the evolution of hydrogen chloride has ceased and, finally, the mixture is heated to boiling, whereby 56 ml of liquid are distilled off. Following this, a hot solution of 2.16 g of 1,4-diaminobenzene in 110 g of anhydrous chlorobenzene is added within 5 minutes with a further addition of 65 g of chlorobenzene and, using a reflux condenser provided with a calcium chloride tube, the mixture is stirred, while gently boiling, until the evolution of hydrogen chloride has ceased.

Finally, the pigment is filtered off hot, washed with hot chlorobenzene until the filtrate is almost colourless, and is dried at 60°. A red pigment is obtained which, in stoving lacquers, has a very good fastness to light and is fast to cross-lacquering.

EXAMPLE 7

In 16.0 g of methanol at 30° are dissolved 2.70 g of sodium methylate and 4.48 g of 1,4-bis-(2'-hydroxy-3'-naphthoylamino)-benzene. While stirring, 160.0 g of o-dichlorobenzene are added and the mixture briefly heated to 45°, cooled to 20° and 3.24 g of 2,5-dichloraniline are added, the mixture then being cooled to 5°.

Ethyl nitrite gas is now introduced, while stirring, in 20 minutes through an inlet tube below the surface of the mixture, the nitrite gas being thereby generated in a connected small flask by the dropwise addition of 5.30 g of 50% sulphuric acid to a stirred mixture of 9.13 g of 33.3% aqueous sodium nitrite solution and 2.30 g of ethanol at 25°. Finally, air is blown in in order to convey the residues of ethyl nitrite into the reaction vessel.

At 8°, 6.30 g of glacial acetic acid are now added dropwise, whereby the coupling components precipitate and the pigment formation commences. The temperature is gradually increased to 20°. After stirring for 65 hours, the pigment suspension is heated within one hour to 80° and within a further hour to 150°, whereby easily volatile fractions are distilled off. The pigment is then filtered off hot, is washed with o-dichlorobenzene until the filtrate is only very slightly red in colour, and it is then washed with methanol before being dried at 60°. By this means are obtained 6.9 g of a deeply coloured red pigment which, in lacquers, is fast to cross-lacquering and which, in soft polyvinyl chloride, has a good fastness to migration.

EXAMPLE 8

In 460 g of distilled o-dichlorobenzene at 135° are dissolved, while stirring, 6.86 g of 4-chloro-3-aminobenzoic acid and then 11.65 g of 2-hydroxy-naphthalene-3-carboxylic acid-2′4′-dimethylanilide. The solution is allowed to cool and, at 60°, 2.90 g of glacial acetic acid are added. Finally, methylnitrite gas, which is generated in a small connected flask by adding dropwise 7.83 g of 50% sulphuric acid to a mixture of 17.0 g of 33.3% aqueous sodium nitrite solution and 2.7 g of methanol, is introduced under the surface of the suspension for 40 minutes at 20°. By blowing air into the small flask, the residual methyl nitrite is passed into the obtained dyestuff suspension. This suspension is subsequently heated within one hour to 30° and in a further hour to 40°. It is further stirred, in the closed flask, for 15 hours at this temperature, whereupon 60 ml of liquid are distilled off in vacuo and another 80 g of o-dichlorobenzene are added to the dyestuff suspension. This is heated at atmospheric pressure to 125°, a mixture of 9.53 g of thionyl chloride and 133 g of o-dichlorobenzene is added within 30 minutes and the mixture heated within 30 minutes to 150°, whereupon 100 ml of liquid are distilled off under reduced pressure. A further 80 g of o-dichlorobenzene are added at atmospheric pressure to the reaction mixture and, finally, an addition is quickly made at 140° of a hot solution of 7.13 g of 2,4-dichloroaniline in 133 g of o-dichlorobenzene. The obtained pigment suspension is further heated for 2 hours at 160° – 163° and, finally, filtered off at 100° and washed with o-dichlorobenzene and methanol. After drying and grinding to a powder, a pigment is obtained ready for use and which can be used, for example, in lacquers, plastics or printing inks.

EXAMPLE 9

In a five-necked flask are dissolved, while stirring, 7.52 g of 2-hydroxynaphthalene-3-carboxylic acid and, subsequently, 6.48 g of 2,5-dichloroaniline in 440 g of distilled chlorobenzene at 105°. After cooling to 20°, methyl nitrite gas is introduced for 40 minutes under the surface of the mixture. This gas is developed in a small connected flask by adding dropwise 4.90 g of 50% sulphuric acid to a mixture of 10.70 g of 33.3% aqueous sodium nitrite solution and 1.70 g of methanol. By blowing air into the small flask, the residual methyl nitrite is passed into the obtained dyestuff suspension. The latter is heated within 30 minutes to 30° and in a further 30 minutes to 60°, whereupon 50 ml of liquid are distilled off in vacuo from the reaction mixture. An addition is then made dropwise at 120° to the dyestuff suspension, at atmospheric pressure and within 30 minutes, of 7.15 g of thionyl chloride mixed with 55 g of chlorobenzene. The dyestuff suspension is subsequently heated to boiling within 30 minutes, whereupon 200 ml of liquid are distilled off on the descending condenser. While boiling, 2.05 g of 1,4-diaminobenzene, dissolved in 110 g of hot chlorobenzene, are added in portions in 3 minutes. The obtained pigment suspension is then refluxed for one hour. After cooling to 100°, the pigment is filtered off, washed with chlorobenzene and then with methanol, dried and ground to a powder. It is ready for use for the pigmenting of highly molecular organic material.

What is claimed is:

1. In a process for the preparation of a metal free azo pigment having at least two -CONH- groups per molecule and a molecular weight of at least 500, by diazotization of a diazotizable amino benzene with a diazotizing agent to form a diazo compound and coupling said diazo compound with a coupling compound, the improvement wherein the diazotization and coupling are performed in a simple operation without separation of the diazo compound, said process comprising admixing:
   a. a diazotizable amino benzene having no sulphonic acid groups
   b. a coupling component which is a 2-hydroxy-naphthalene-3-carboxylic acid phenyl or naphthyl amide, said component having no sulphonic acid groups, active methylene or tertiary nitrogen groups, and
   c. a diazotizing agent selected from the group consisting of alkyl nitrite, dinitrogen tetroxide, dinitrogen trioxide, nitrosyl chloride, nitrosyl bromide and sodium nitrite
      in an organic liquid selected from the group consisting of liquid aromatic hydrocarbons or liquid aromatic hydrocarbons which are substituted by halo, nitro or lower alkyl, said solvent containing at most 10% water,
      the amount of said organic liquid being such that a substantial portion either of the diazo component or of the said coupling component, or of both these reactants remains undissolved therein.

2. A process according to claim 1 wherein the diazotizable amine is selected from the group consisting of
2,4- and 2,5-dichloraniline,
2,4,5-trichloraniline,
2-chloro-4-nitraniline,
4-chloro-2-nitraniline,
2-methoxy-4-nitraniline,
4-methoxy-2-nitraniline,
2-aminobenzoic acid methyl ester,
aminoterephthalic acid dimethyl ester and -diethyl ester,
4-methoxy-3-aminophenyl benzyl sulphone,
4-methyl-3-aminodiphenyl sulphone,
4-methoxy-3-aminobenzene sulphonic acid diethyl amide,
2-methoxy-5-methyl-4-aminobenzene sulphonic acid methyl amide,
2,5-dimethoxy-4-aminobenzoic sulphonic acid anilide,
2,5-dimethoxy- and 2,5-diethoxy-4-benzoylaminoaniline,
2-methoxy-5-methyl-4-benzoylaminoaniline,
4-ethoxy-3-aminobenzamide,
4-methoxy-3-aminobenzoic acid anilide,
4-methyl-3-aminobenzoic acid-2′4′-dimethylanilide,
4-methyl-3-aminobenzoic acid-4′-chloranilide,
4-chloro-3-aminobenzoic acid-2′-methyl-5′-chloranilide,
4-chloro-3-aminobenzoic acid-2′4′- and -2′5′-dichloranilide, 4-chloro-3-aminobenzoic acid-2'4'5'-trichloranilide,
4-chloro-3-aminobenzoic acid-2'-methyl-3'-chloroanilide,
4-carbethoxy-3-aminobenzoic acid-2'5'-dichloranilide,
4-chloro-3-aminobenzoic acid,
4-methoxy-3-aminobenzoic acid,
4-methyl-3-aminobenzoic acid,
3,3'-dichlorobenzidine,
2,5,2'5'-tetrachlorobenzidine,
3,3'-dimethoxybenzidine and
3,3'-dimethylbenzidine,
and the coupling component is selected from the group consisting of
   2-hydroxynaphthalene-3-carboxylic acid anilide, -4'-chloranilide, -3'-nitranilide, -2'-methoxyanilide, -2'-methylanilide, -2'3'-dimethylanilide, -2'4'-dimethoxy-5'-chloranilide, -2'5'-dimethoxy-4'-chloranilide, =2'-methyl-4'-chloranilide, -2'-methyl-4'-methoxyanilide,
   6-(2'3'-hydroxynaphthoylamino)-2,4-dioxotetrahydroquinazoline,
   5-(2',3'-hydroxynaphthoylamino)-benzimidazolone-(2),
   1-(2',3'-hydroxynaphthoylamino)-2-methoxy-5-chloro-4-benzoyl-aminobenzene,
   3(2',3'-hydroxynaphthoylamino)-4-chlorobenzoic acid-2''5''-dichloranilide,
   2-hydroxynaphthalene-3-carboxylic acid,
   2-hydroxycarbazole-3-carboxylic acid,
   bis-(2'3'-hydroxynaphthoyl)-1,4-diaminobenzene, -1,4-diamino-2-chlorobenzene, -1,4-diamino-2-methyl-5-chlorobenzene, -benzidine, o-tolidine, -1,4-diamino-2,5-dimethoxybenzene, -1,4-diamino-2,5-dimethylbenzene, -1,4-diamino-2,5-dichlorobenzene, -1,4-diamino-2-methoxy-5-chlorobenzene, and -pp'-diaminodiphenyl ether.

3. A process according to claim 1 wherein the alkyl nitrite is a $C_1$–$C_8$ alkyl nitrite.

4. A process according to claim 1 wherein the solvent is chlorobenzene, o-dichlorobenzene, benzene, toluene, xylene or nitrobenzene and the diazotizing agent is sodium nitrite.

5. A process according to claim 1 wherein the diazotizing agent is added to the suspension of coupling agent and amine.

6. A process according to claim 4 wherein the diazotizing agent is added to the suspension of coupling agent and amine.

7. A process as defined in claim 1 wherein an azo pigment of the formula

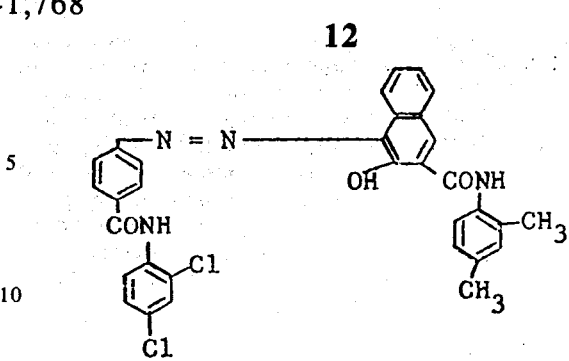

is prepared.

8. A process as defined in claim 1 wherein an azo pigment of the formula

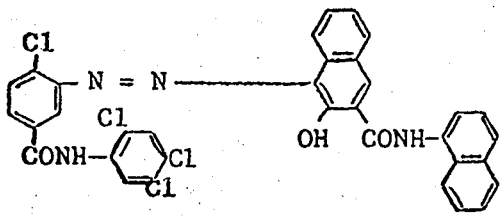

is prepared.

9. A process as defined in claim 1 wherein an azo pigment of the formula

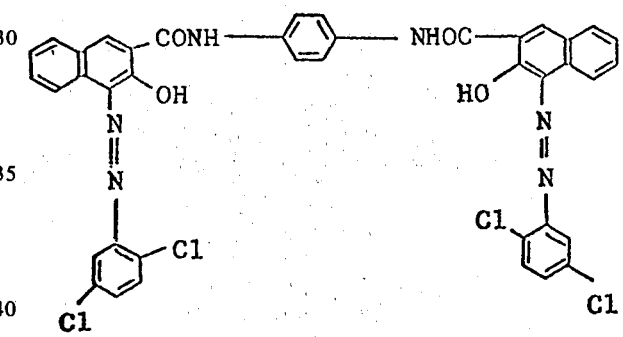

is prepared.

10. A process for manufacturing an azo pigment wherein 31.6g. 4-chloro-3-amino-benzoic acid-2'4'-dichloranilide and 29.5g. 2-hydroxy-naphthalene-3-carboxylic acid-2'4'-dimethylanilide are added to 71.0g. o-dichlorobenzene to form a mixture and then 60.0 g. of glacial acetic acid is added to the mixture; the mixture is cooled to 15°C and gaseous ethyl nitrite is added; the resultant pigment is heated and recovered by filtration.

* * * * *